(12) United States Patent
Barrett

(10) Patent No.: US 7,216,906 B2
(45) Date of Patent: May 15, 2007

(54) CARABINER HOLDER

(76) Inventor: Russell Barrett, P.O. Box 990007, Redding, CA (US) 96099-0007

( * ) Notice: Subject to any disclaimer, the term of this patent is extended or adjusted under 35 U.S.C. 154(b) by 0 days.

(21) Appl. No.: 11/146,439

(22) Filed: Jun. 6, 2005

(65) Prior Publication Data
US 2005/0275230 A1 Dec. 15, 2005

Related U.S. Application Data

(60) Provisional application No. 60/579,002, filed on Jun. 11, 2004.

(51) Int. Cl.
*A47F 13/06* (2006.01)
(52) U.S. Cl. .................................................. 294/19.1
(58) Field of Classification Search ............... 294/19.1, 294/22, 24; 24/599.1, 599.4
See application file for complete search history.

(56) References Cited

U.S. PATENT DOCUMENTS

| | | | | |
|---|---|---|---|---|
| 2,204,482 A | * | 6/1940 | Filipiak | 294/19.2 |
| 3,055,329 A | * | 9/1962 | Door | 269/6 |
| 3,462,184 A | * | 8/1969 | Russell | 294/19.2 |
| 3,743,338 A | * | 7/1973 | Seeger | 294/19.2 |
| 3,773,374 A | * | 11/1973 | D'Luhy | 294/19.2 |
| 4,595,223 A | * | 6/1986 | Hawie | 294/19.1 |
| 4,793,646 A | * | 12/1988 | Michaud, Jr. | 294/19.1 |
| 5,253,408 A | * | 10/1993 | Wright | 29/280 |
| 5,277,466 A | * | 1/1994 | Wall | 294/19.2 |
| 5,820,181 A | * | 10/1998 | Le Noach | 294/19.1 |
| 5,997,062 A | * | 12/1999 | Schwartz | 294/19.2 |
| 6,510,599 B2 | | 1/2003 | AmRhein | |

* cited by examiner

*Primary Examiner*—Eileen D. Lillis
*Assistant Examiner*—Esther Onyinyechi Okezie
(74) *Attorney, Agent, or Firm*—Klarquist Sparkman, LLP

(57) ABSTRACT

A carabiner holder comprises a carabiner retaining portion and an extension member attachment portion. The retaining portion is configured to releasably retain a carabiner and comprises a first member positioned to engage a first side of the carabiner adjacent a carabiner gate and a second member positioned to engage a second side of the carabiner opposite the first side. The first member and the second member are positioned opposite each other and separated by a first distance at rest. At least one of the first and second members is resiliently movable to allow the first and second members to be separate relative to each other by a second distance greater than the first distance when engaged with a carabiner. The extension member attachment portion is connected to the retaining portion and allows the holder to be attached to an extension member to extend the holder's reach.

3 Claims, 3 Drawing Sheets

CARABINER HOLDER

CROSS REFERENCE TO RELATED APPLICATION

This application claims the benefit of U.S. Provisional Application Ser. No. 60/579,002, which was filed Jun. 11, 2004 and names Russell Barrett as the inventor. This prior application is incorporated by reference herein.

BACKGROUND

This application relates to climbing, rescue and construction equipment, and in particular to an approach for releasably holding a carabiner or similar device, e.g., to extend a user's reach and allow the carabiner it to be secured to or removed from an object.

Carabiners, which are also referred to as snap links, are used in rock and alpine climbing, construction and industrial settings and rescue work as part of a safety system. In general, a carabiner resembles a link of a chain with a spring-biased movable portion or gate that, when opened, allows the carabiner to be passed though an opening in or around another object. Typically, the object is fixed, and the user's connection to that object is by way of a rope, sling or tether attached at one end to the user (usually by a harness) and at its other end to the carabiner (either as a fixed connection or running through the carabiner).

Such objects are selected based on the expectation that they will sustain or reduce the forces exerted on the user if he falls, thus limiting the user's injuries. In some cases, a suitable object is not within easy reach. For example, on many sport climbing routes, the first object is a bolt with a hanger secured to the rock face, but it is located out of arm's reach of most users. Conventional devices for holding a carabiner in an opened position and having an elongated handle for extending the user's reach are known, but these devices tend to be overly complicated in operation and not sufficiently rugged for use in typical conditions experienced in climbing, industrial and rescue situations.

SUMMARY

Disclosed below are representative embodiments that are not intended to be limiting in any way. Instead, the present disclosure is directed toward novel and non-obvious features, aspects and equivalents of the embodiments of the carabiner holder or reach extender described below, as well as associated methods. The disclosed features and aspects of the embodiments can be used alone or in various novel and nonobvious combinations and sub-combinations with one another. The disclosed approaches provide a simpler and more robust solution to holding and manipulating carabiners.

According to one aspect, a carabiner holder comprises a carabiner retaining portion configured to releasably retain a carabiner and an extension member attachment portion. The retaining portion comprises a first member positioned to engage a first side of the carabiner adjacent a carabiner gate and a second member positioned to engage a second side of the carabiner opposite the first side. The first member and the second member are positioned opposite each other and separated by a first distance at rest, and at least one of the first and second members is resiliently movable to allow the first and second members to be separated by a second distance greater than the first distance when engaged with a carabiner. The extension member attachment portion is connected to the retaining portion and allows the holder to be attached to an extension member to extend the holder's reach.

The extension member attachment portion can be configured for a threaded connection to an extension member. The extension member attachment portion can be configured for attachment over an edge of an object. The extension member attachment portion can be configured for attachment to a blade of a paddle or oar. The holder can be substantially constructed of a single piece of stock that has been formed into the carabiner retaining portion and the extension member attachment portion. The holder can be substantially comprised of stainless steel rod or wire.

The holder can comprise a cover member that at least partially covers a portion of the carabiner retaining portion. The carabiner holder can comprise a connecting portion that maintains the first member and the second member in desired positions relative to each other. The retaining portion can comprise a stop positioned to resist movement of a carabiner held in the holder. The first member can be shaped to urge the gate of a carabiner to at least a partially opened position when the carabiner is held in the holder.

The extension member attachment portion can define an extension axis, the retaining portion can define a retention axis, and the retention axis can be laterally offset from the extension axis. The holder can comprise an extension member for attachment to the extension member attachment portion.

According to another aspect, a carabiner holder comprises a single piece of material having a first end formed into a generally helical coil, continuing in a first side comprising a long straight segment, an outwardly flared return bend, a short straight segment, and an angled segment, the first side continuing in a connecting portion, the connecting portion continuing in a second side spaced apart from and opposite the first side, the second side comprising an angled segment, a short straight segment, an outwardly flared return bend and a straight segment that terminates in a second end of the material, and the first and second sides are positioned to releasably receive a carabiner.

The coil can threadedly receive an extension member for extending the reach of the carabiner holder. The coil can define an extension axis, and the first side and the second side can be laterally offset from the extension axis.

According to another aspect, a carabiner holder comprises a holding portion having a first side configured to contact at least a gate of a carabiner and to hold the gate in at least a partially open position when the carabiner is engaged with the holder, and a second side positioned opposite the first side and configured to contact a spine of the carabiner when the carabiner is engaged with the holder, the first and second sides being coupled together by a junction that maintains the first and second sides spaced-apart in an at rest position by a first distance, and wherein at least one of the first and second sides is movable relative to the other against a resilient biasing force in the holder to allow the first and second sides to be separated from each other by a second distance greater than the first distance to pass over the carabiner when the carabiner is engaged with and disengaged from the holder.

The first distance separating the first side and the second side in the at rest position can be sized to allow a climbing rope threaded through the carabiner to pass freely between the first side and the second side as the carabiner is disengaged from the holder. The holder can be disengaged from a carabiner by withdrawing it in a direction away from the carabiner while the carabiner is held in place, thereby overcoming the resilient biasing force and forcing the first and second sides to separate relative to each other as the holder is slid over the carabiner until it is disengaged from the carabiner.

With the first side and the second side in contact with respective portions of the carabiner, the carabiner holder can be urged into engagement with the carabiner such that the carabiner is retained by the holder using a single thrusting motion directed along an axis of the carabiner. The holder can be engaged with or disengaged from a carabiner using a one-handed operation.

DETAILED DESCRIPTION

Figure 1:
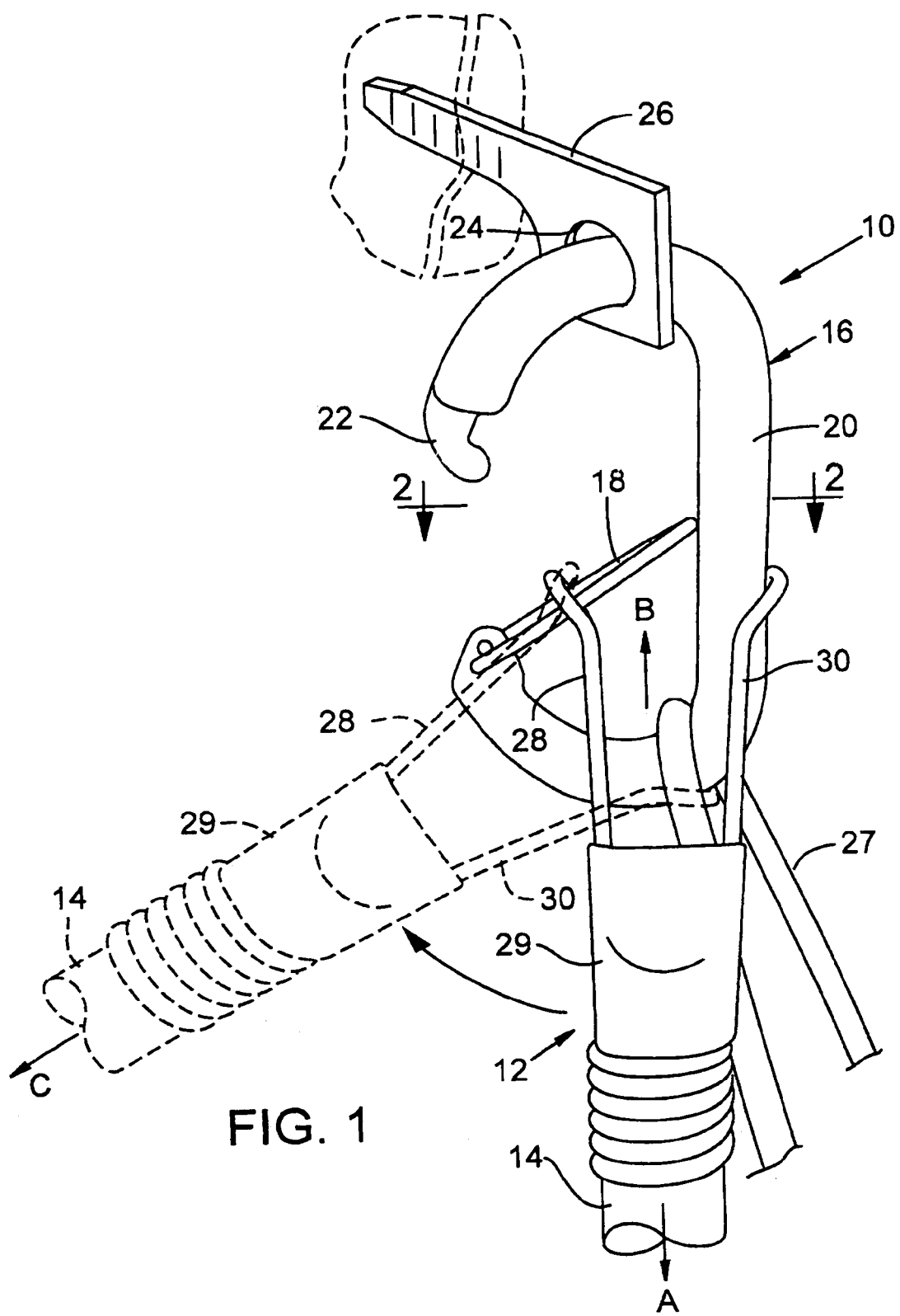
FIG. 1 is a perspective view showing the carabiner holder with a carabiner releasably held in place in an opened position and having a rope threaded through it and the carabiner having been passed through an eye in a piton, the dashed lines showing the holder after it has been rotated and as it begins to disengage and release the carabiner.

FIG. 1 is a shows an embodiment of a carabiner holder 10 holding a carabiner 16 in the opened position. In this embodiment, the carabiner holder 10 has a retaining portion 12 that releasably secures a carabiner, such as the carabiner 16 as shown, and an extension member 14 connected to the retaining portion 12 that serves to extend the user's reach.

The carabiner 16 has a gate 18, which is held in the opened position by the retaining portion 12 against a biasing force (usually exerted by a spring of the carabiner) tending to urge the gate 18 to a closed position. When the gate 18 is in the closed position (not shown), it contacts the carabiner's free end 22. On a side opposite the gate 18, the carabiner 16 has a spine 20.

In FIG. 1, the free end 22 of the carabiner 16 has been threaded through an eye 24 in a piton 26 that is secured to a surface, such as a rock face. In the same way, the carabiner could be coupled to any other type of fixed object expected to withstand or at least reduce the forces experienced by a user in the event of a fall. Such fixed objects would include other types of rock, alpine or sport climbing protection, nearby objects in an industrial setting, such as a beam, or any other suitable object. The holder 10 can also be used to couple the carabiner 16 to a rope that is out of reach.

In FIG. 1, a bight of climbing rope 27 is shown threaded through the carabiner 16. The bight of rope 27 may be knotted in a loop, or it may be allowed to pass freely through the carabiner 16. Instead of the rope 27, a sling or a tether could be attached to the carabiner 16. In most uses, another portion of the rope, sling or tether is connected to the user, usually by way of a harness. In some situations, the carabiner holder 10 is used to place or retrieve carabiners without any attached rope, sling or tether.

The retaining portion 12 comprises a pair of generally opposed arms 28, 30. The arm 28, also referred to as the first arm, is shown contacting the gate 18 and forcing it at least partially open. The arm 30, also referred to as the second arm, is shown contacting the spine 20.

Figures 4A, 4B, 5A, 5B:
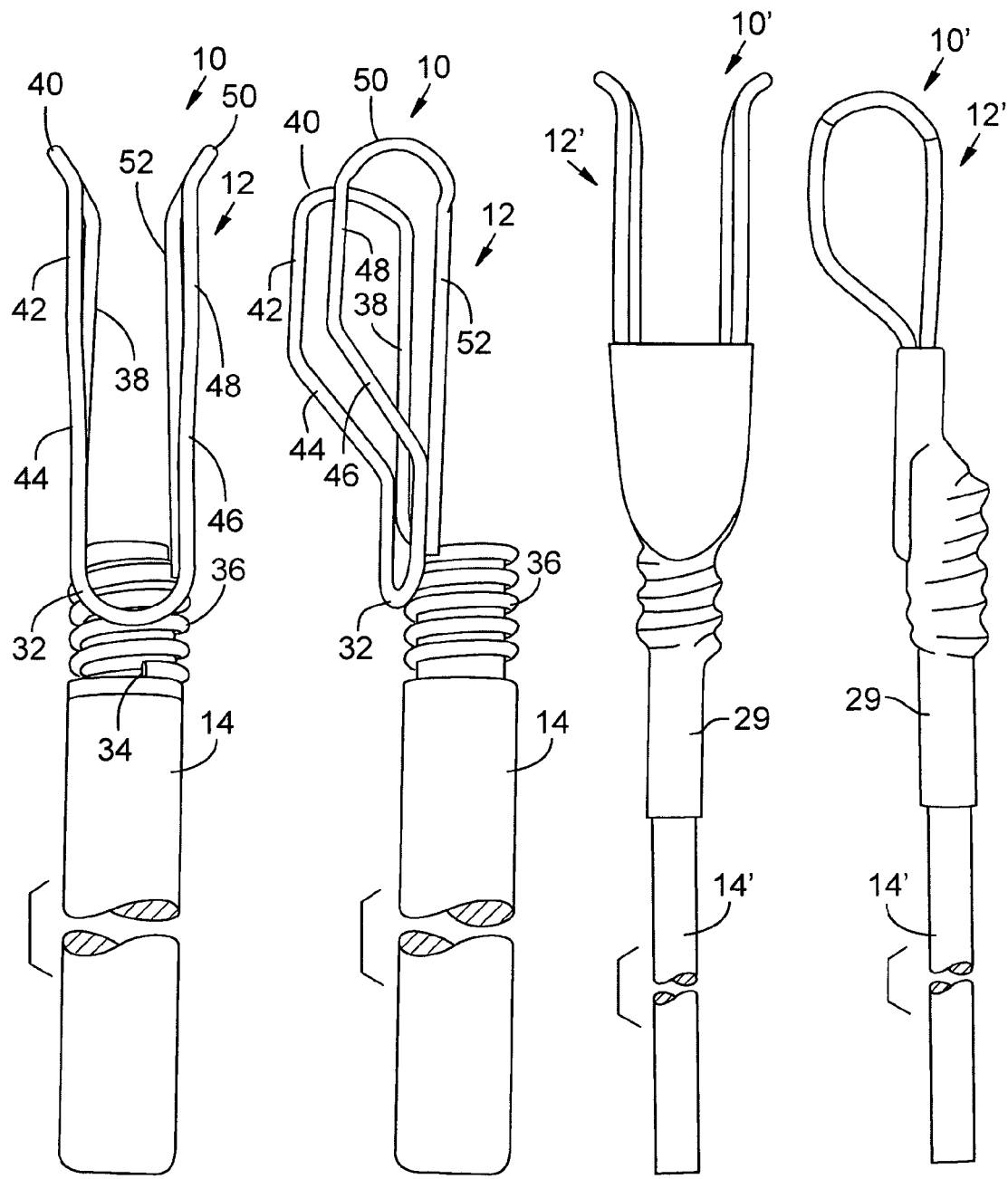
FIGS. 4A and 4B are front and rotated side perspective views, respectively, of the carabiner holder of FIG. 1 with the rope and the cover over the retaining portion removed for clarity.
FIGS. 5A and 5B are front and side perspective views, respectively, of an alternative carabiner holder having a retaining portion configured to receive an extension member of a reduced diameter.

In some embodiments, both of the arms 28, 30 are resilient, and the arms can be spread apart from their positions at rest, e.g., as shown in FIG. 4A. To move the arms from the at rest position, the resilient force tending to return the arms to that position must be overcome. This resilient force can be calibrated as necessary to provide sufficient force to hold a carabiner, yet allow the holder 10 to be engaged and disengaged from a carabiner with sufficient ease. In some embodiments, one of the arms 28, 30 is relatively rigid and only the other arm is resilient.

To disengage the holder 10 from the carabiner 16, the holder 10 can be withdrawn in the direction A (FIG. 1). Withdrawing the holder 10 while the carabiner 16 remains in place by way of its connection to the piton 26 causes the arms 28, 30 to spread away from each other and to slide along the carabiner 16, and past the rope 27, until they disengage from the carabiner 16 and release it.

To reengage the holder 10 with the carabiner 16, the process is reversed, and the holder 10 is forced over the carabiner 16 by urging it in the direction B with the arms 28, 30 aligned to engage the gate 18 and the spine 20, respectively. The arms 28, 30 initially spread apart and then return to their positions as shown in the FIG. 1 with the arm 28 urging the gate 18 open and the arm 30 in contact with the spine 20. Curved portions of the arms 28, 30 can be used as guides to follow a rope leading up to a carabiner to be retrieved.

Figure 3:
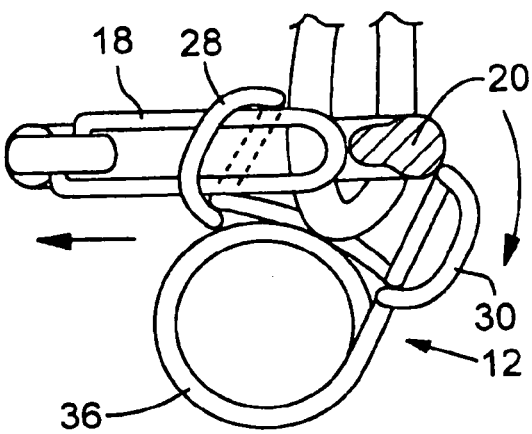
FIG. 3 is a view similar to FIG. 2, except showing that the holder can also be rotated about its longitudinal axis as part of the process to disengage and release the carabiner.

Alternatively, depending upon the geometry of the carabiner 16, it may be possible to disengage the holder 10 by pivoting it to a position such as is shown in dashed lines in FIG. 1 before withdrawing it in the direction C. In the dashed line view of the arms 28, 30, they are shown spreading apart from each other as they are urged to pass over wider sections of the carabiner 16. It may also be possible to rotate the holder 10 about its longitudinal axis to assist in disengaging the carabiner, as shown in FIG. 3.

Figure 2:
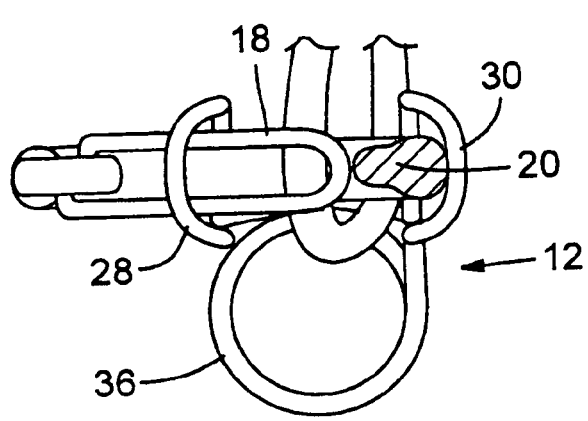
FIG. 2 is a top plan sectioned view taken at 2—2 in FIG. 1 and showing the position of the carabiner when it is secured in the holder.

Referring to FIG. 2, which shows a plan view of a portion of the holder 10, in some embodiments the arms 28, 30 are offset from an axis defined by the extension member (i.e., an axis passing through the approximate center of the coil 36). In this way, the holder 10 can be positioned near a surface, such as a rock face, in positioning the holder to place or retrieve a carabiner. The offset also provides clearance and prevents interference during manipulation of the holder 10 when the carabiner 16 has other objects attached to it, such as when the carabiner 16 has an attached sling with a second carabiner at its opposite end (commonly called a "quick draw"). As also shown in FIGS. 1 and 2, the space below the offset allows both strands of the rope 27 passing through the carabiner 16 to lie on the same side of the holding portion 12, such that the strands can hang approximately parallel to the extension member 14 for easy manipulation and one-handed handling.

The extension member 14 is generally sized as needed to extend the user's reach. The extension member 14 may be a dedicated handle, such as a readily available conventional handle for a household tool, e.g., a broom handle. Alternatively, the extension member 14 may be a piece of equipment that has another use, e.g., a tent pole, ski pole, avalanche probe, paddle, oar, or other elongate object (e.g., a stick) that extends the user's reach by a sufficient amount and is sufficiently rigid to allow the carabiner (and optionally, a rope carried by the carabiner) to be manipulated.

In some embodiments, the retaining portion 12 and the extension member 14 are configured for connection together by a threaded connection, such as by the attachment end or coil 36 of the retaining portion 12 as best seen in FIGS. 4A and 4B. Other connection types are, of course, possible.

The retaining portion 12, and specifically the arms 28, 30, are configured to releasably secure the carabiner 16 such that it can be manipulated at a distance away from the user, e.g., to couple the carabiner 16 to or remove it from an object. In some embodiments, the arms 28, 30 are maintained in a desired relationship relative to each other by a connecting portion 32 that connects the arms 28, 30 together opposite their free ends.

In specific embodiments, the retaining portion 12 can be constructed of a single piece of stock that is formed to the desired final shape. Referring to FIGS. 4A and 4B, beginning at a first end 34, the coil 36 is formed. At the upper end of the coil 36, the first arm 28 is formed to have a long straight section 38, an outwardly curved portion or flared return bend 40, a short straight section 42, and an angled section 44. The angled section joins the connecting portion 32. At the other end of the connecting portion 32, the second arm is formed to have an angled section 46, a short straight section 48, an outwardly curved portion or flared return bend 50 and a long straight section 52 that terminates in a second end 54 adjacent the connecting portion. Other geometries are also possible. One way of optimizing the fit of the retaining portion for a specific size and shape of carabiner is by adjusting the length of one or more of the segments.

The retaining portion 12 is configured to provide a stop that contacts the lower end of the carabiner 16 and allows force to be applied against it and prevents it from being "pushed through" the holder. In some embodiments, the stop is provided by the shape of the arms 28, 30. For example, the carabiner 16 in its position in FIG. 1 is stopped by contact between the carabiner 16 and the junction of the segments 38 and 44 on the first arm 28 and the junction of the segments 46 and 52 on the second arm. Other stop configurations are, of course, possible.

FIGS. 5A and 5B show an embodiment of a holder 10' sized for coupling with an extension member 14' of a smaller diameter. Such an extension member 14' may be a tent pole, a ski pole shaft, an avalanche probe or a dedicated handle of a smaller diameter. Instead of a threaded connection, the retaining portion 12' may be configured for a force-fit connection with the extension member 14'. If desired, the sleeve 29 can have an extended length as shown to assist in keeping together the extension member 14' and the retaining portion 12'.

Figure 6:
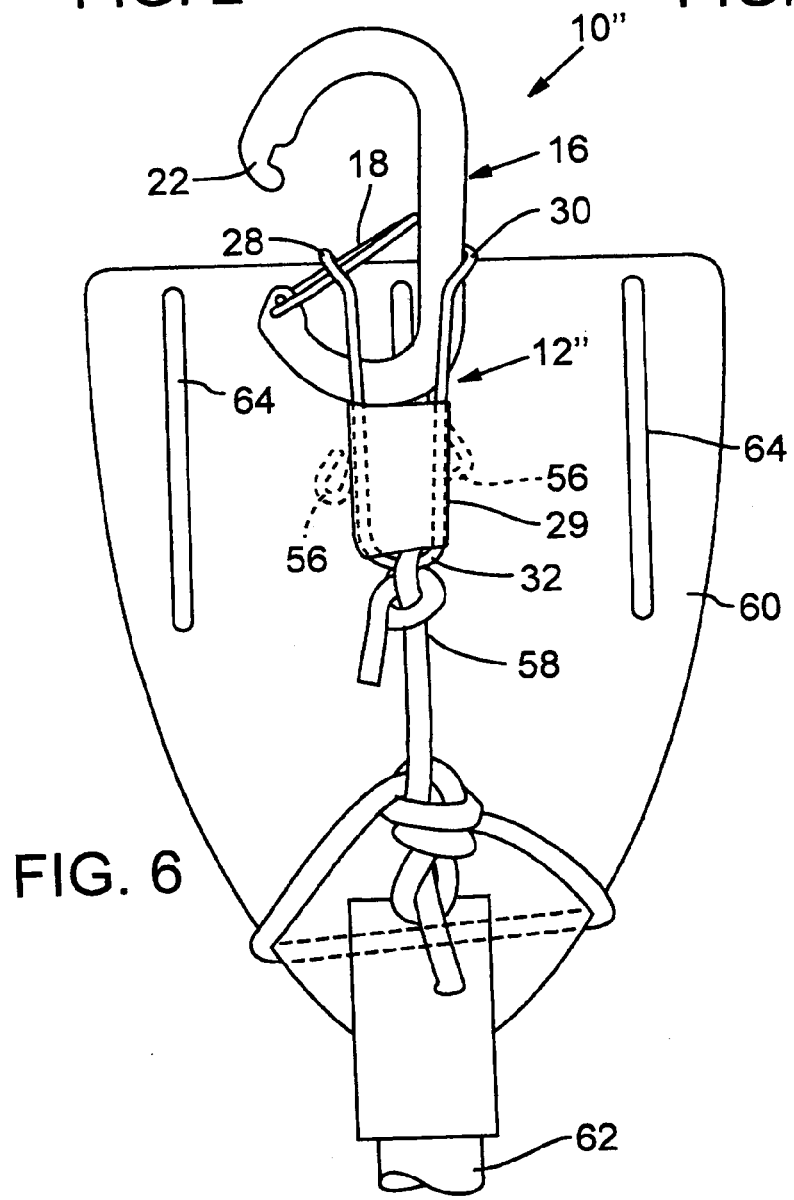
FIG. 6 is a perspective view of an alternative carabiner holder adapted for fitting over a flat surface such as a paddle blade.

FIG. 6 shows an alternative embodiment of the holder 10" with a retaining portion 12" specifically adapted for fitting over an edge of a generally flat object, e.g., a paddle blade 60. In this way, the paddle blade 60 and its shaft 62 serve as the extension member, which is particularly useful in water rescue situations, e.g., to connect a carabiner with a rescue rope threaded through it to the personal flotation device of a victim in the water, to a guy line on a raft or to an object that fallen overboard.

The retaining portion 12" can be shaped as shown such that the arms 28, 30 have bent-back ends 56 that facilitate sliding the retaining portion into place over the paddle blade 60. Although not required, the retaining portion 12" can positioned as shown such that the arms 28, 30 straddle a rib 64 formed in the paddle blade 60.

As shown in FIG. 6, the retaining portion 12" can have an attached sling or rope 58 that serves to keep the retaining portion in place on the paddle blade 60 when the paddle is withdrawn to disengage the holder 10" from the carabiner 16. The rope 58 can be looped or tied around the junction of the paddle blade 60 and the shaft 62 as shown, or through any available openings in the paddle blade 60. Other approaches to keeping the retaining portion 12 in place on the paddle during use could also be used.

In some embodiments, the cover 29 is made from a shrink tubing. Other suitable materials for the cover 29 would include rubber, rubber-like materials or plastics, including injection molded plastics. In some embodiments, the arms 28, 30 are made of a steel, such as a spring steel. In some embodiments, a stainless spring steel is used. In other embodiments, it would be possible to make the arms from another material having sufficient resiliency and strength.

Although the examples shown in the drawings show only a substantially oval-shaped carabiner, the holder can be used without modification with other conventional carabiners, including pear-shaped and D-shaped carabiners, such as by adapting the length of the various segments as described above.

The holder allows for one-handed operation since there is no mechanism requiring separate actuation to release a carabiner from the holder or to engage the holder with a carabiner. In some embodiments of the holder, although the arms 28, 30 can move relative to each other, they are formed from a single piece of material, which reduces the risks of failed connections and lost parts.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. I therefore claim as my invention all that comes within the scope and spirit of these claims.

I claim:

1. A carabiner holder, comprising a single piece of material having a first end formed into a generally helical coil, continuing in a first side comprising a long straight segment, an outwardly flared return bend, a short straight segment, and an angled segment, the first side continuing in a connecting portion, the connecting portion continuing in a second side spaced apart from and opposite the first side, the second side comprising an angled segment, a short straight segment, an outwardly flared return bend and a straight segment that terminates in a second end of the material, and wherein the first and second sides are positioned to releasably receive a carabiner.

2. The carabiner holder of claim 1, wherein the coil can threadedly receive an extension member for extending the reach of the carabiner holder.

3. The carabiner holder of claim 1, wherein the coil defines an extension axis, and wherein the first side and the second side are laterally offset from the extension axis.

* * * * *